US009509621B2

(12) United States Patent
Gulati et al.

(10) Patent No.: US 9,509,621 B2
(45) Date of Patent: *Nov. 29, 2016

(54) DECENTRALIZED INPUT/OUTPUT RESOURCE MANAGEMENT

(71) Applicant: VMware, Inc., Palo Alto, CA (US)

(72) Inventors: Ajay Gulati, Palo Alto, CA (US); Irfan Ahmad, Mountain View, CA (US); Jyothir Ramanan, Sunnyvale, CA (US); Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/263,231

(22) Filed: Apr. 28, 2014

(65) Prior Publication Data
US 2014/0237113 A1 Aug. 21, 2014

Related U.S. Application Data

(63) Continuation of application No. 12/834,473, filed on Jul. 12, 2010, now Pat. No. 8,719,401.

(51) Int. Cl.
| | | |
|---|---|---|
| *G06F 15/16* | (2006.01) | |
| *G06F 15/167* | (2006.01) | |
| *H04L 12/841* | (2013.01) | |
| *H04L 12/911* | (2013.01) | |
| *H04L 12/923* | (2013.01) | |
| *H04L 12/26* | (2006.01) | |
| *H04L 29/08* | (2006.01) | |
| *H04L 12/801* | (2013.01) | |
| *H04L 12/807* | (2013.01) | |
| *H04L 12/853* | (2013.01) | |
| *H04L 12/825* | (2013.01) | |

(52) U.S. Cl.
CPC ............. *H04L 47/283* (2013.01); *H04L 43/00* (2013.01); *H04L 43/0852* (2013.01); *H04L 43/0864* (2013.01); *H04L 47/19* (2013.01); *H04L 47/27* (2013.01); *H04L 47/746* (2013.01); *H04L 47/762* (2013.01); *H04L 47/826* (2013.01); *H04L 67/1097* (2013.01); *H04L 47/2416* (2013.01); *H04L 47/25* (2013.01)

(58) Field of Classification Search
CPC .............................. H04L 47/27; H04L 47/25
USPC .................................................. 709/217, 224
See application file for complete search history.

(56) References Cited

U.S. PATENT DOCUMENTS

| | | |
|---|---|---|
| 6,654,344 B1 | 11/2003 | Toporek et al. |
| 6,675,211 B1 | 1/2004 | Mamaghani et al. |
| 6,886,035 B2 | 4/2005 | Wolff |

(Continued)

*Primary Examiner* — Karen Tang
(74) *Attorney, Agent, or Firm* — Patterson & Sheridan LLP (57) ABSTRACT

A shared input/output (IO) resource is managed in a decentralized manner. Each of multiple hosts having IO access to the shared resource, computes an average latency value that is normalized with respect to average IO request sizes, and stores the computed normalized latency value for later use. The normalized latency values thus computed and stored may be used for a variety of different applications, including enforcing a quality of service (QoS) policy that is applied to the hosts, detecting a condition known as an anomaly where a host that is not bound by a QoS policy accesses the shared resource at a rate that impacts the level of service received by the plurality of hosts that are bound by the QoS policy, and migrating workloads between storage arrays to achieve load balancing across the storage arrays.

10 Claims, 7 Drawing Sheets

(56) References Cited

U.S. PATENT DOCUMENTS

| | | |
|---|---|---|
| 7,158,536 B2 | 1/2007 | Ching et al. |
| 7,213,077 B2 | 5/2007 | Border |
| 7,356,679 B1 | 4/2008 | Le et al. |
| 7,373,417 B1 | 5/2008 | Abbasi et al. |
| 7,420,990 B2 | 9/2008 | Ching et al. |
| 7,551,623 B1 | 6/2009 | Feroz et al. |
| 7,606,887 B1 | 10/2009 | Stewart et al. |
| 7,643,418 B1 | 1/2010 | Varier et al. |
| 7,720,954 B2 | 5/2010 | Raja et al. |
| 7,865,584 B2 | 1/2011 | Grossner et al. |
| 7,873,060 B2 | 1/2011 | Luo et al. |
| 7,912,951 B2 | 3/2011 | Gulati et al. |
| 8,064,910 B2 | 11/2011 | Lee |
| 8,127,014 B2 | 2/2012 | Gulati et al. |
| 8,140,827 B2 | 3/2012 | Liang et al. |
| 8,250,197 B2 | 8/2012 | Gulati et al. |
| 2004/0057383 A1 | 3/2004 | Tseng et al. |
| 2004/0068461 A1 | 4/2004 | Schluetter |
| 2004/0194095 A1* | 9/2004 | Lumb et al. ............... 718/100 |
| 2005/0021591 A1 | 1/2005 | Boyd et al. |
| 2005/0021879 A1* | 1/2005 | Douglas ...................... 710/5 |
| 2005/0141419 A1 | 6/2005 | Bergamasco et al. |
| 2006/0090163 A1 | 4/2006 | Karisson et al. |
| 2006/0168594 A1 | 7/2006 | Deverill et al. |
| 2007/0104188 A1 | 5/2007 | Kuc |
| 2007/0162462 A1 | 7/2007 | Zhang et al. |
| 2008/0046558 A1 | 2/2008 | Raja et al. |
| 2008/0141333 A1 | 6/2008 | Chen et al. |
| 2008/0244209 A1* | 10/2008 | Seelam et al. ............. 711/168 |
| 2008/0320278 A1* | 12/2008 | Liang et al. ................. 712/29 |
| 2009/0106602 A1 | 4/2009 | Piszczek et al. |
| 2009/0327481 A1 | 12/2009 | Rickard et al. |
| 2010/0191712 A1 | 7/2010 | Wolman et al. |
| 2010/0191851 A1 | 7/2010 | Raja et al. |
| 2010/0250742 A1 | 9/2010 | Leighton et al. |
| 2011/0022705 A1 | 1/2011 | Yellamraju et al. |
| 2011/0055390 A1 | 3/2011 | Malloy et al. |

* cited by examiner

DECENTRALIZED INPUT/OUTPUT RESOURCE MANAGEMENT

CROSS REFERENCE TO RELATED APPLICATION

This application claims the benefit of U.S. patent application Ser. No. 12/834,473, filed on Jul. 12, 2010, entitled "Decentralized Input/Output Resource Management now issued as U.S. Pat. No. 8,719,401.

BACKGROUND

Modern data centers often have a multi-tier configuration wherein a front end server accesses one or more layers of middle-tier and back-tier servers for various services. One example of a back-end server is a storage array. Storage arrays form the backbone of modern data centers by providing consolidated data access to multiple applications simultaneously. Increasingly, organizations are moving towards consolidated storage, either using block-based access over a Storage Area Network (SAN) or file-based access over Network-Attached Storage (NAS) systems. A Storage Area Network is a network whose primary purpose is the transfer of data between computer systems and storage elements. Easy access from anywhere at anytime, ease of backup, flexibility in allocation and centralized administration are some of the advantages of storage arrays.

When multiple clients share a storage array, access to the storage arrays by the different clients is typically managed. Most existing storage array management solutions provide bandwidth allocation among multiple clients running on a single host. In that case, one centralized scheduler has complete control over requests going to the storage arrays. Other approaches try to control the queue length at the storage array to provide tight latency control, but they are also centralized. In a distributed case, throttling based approaches such as Hewlett-Packard's "Triage" system have been proposed. Such host-based throttling solutions use centralized monitoring and work at a very coarse granularity which may cause substantial loss in utilization. Running them at finer granularity may cause a prohibitive increase in communication costs. In general, strict throttling solutions lead to efficiency losses and non work-conserving behavior.

SUMMARY

One or more embodiments of the present invention provide decentralized input/output (IO) management of a shared resource, such as a storage array. In one embodiment, each of multiple hosts having IO access to the shared resource, computes an average latency value that is normalized with respect to average IO request sizes and stores the computed normalized latency value for later use. The normalized latency values thus computed and stored may be used for a variety of different applications, including enforcing a quality of service (QoS) policy that is applied to the hosts, detecting a condition known as an anomaly where a host that is not bound by a QoS policy accesses the shared resource at a rate that impacts the level of service received by the plurality of hosts that are bound by the QoS policy, and migrating workloads between storage arrays to achieve load balancing across the storage arrays.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1A:
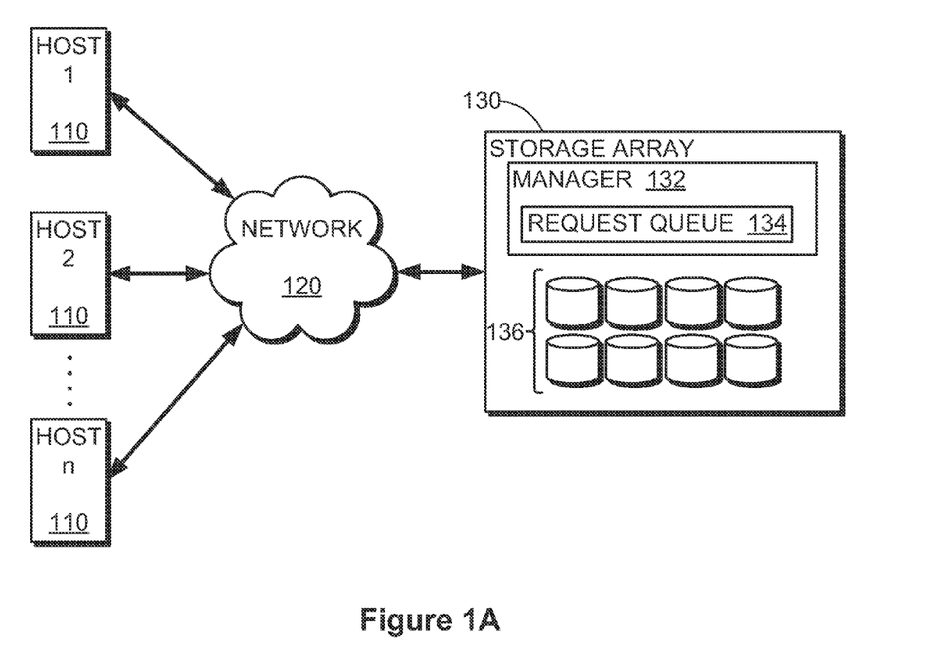
FIG. 1A illustrates a system having a plurality of hosts accessing a common storage array, which may benefit from one or more embodiments of the present invention.

FIG. 1A is a block diagram that shows by way of example a system having a plurality of hosts 110 connected through interconnect network 120 to a shared resource such as storage array 130. There may be any number n of hosts 110, each of which may comprise a general purpose computer system having one or more applications, virtual machines, or other entities, accessing data stored on storage array 130. Interconnect network 120 may be a wide area network a local area network, or a network hosting a protocol especially suited for storage arrays, such as Fibre Channel, iSCSI, HyperSCSI, etc. For example network 120 may comprise one or more of Fibre Channel switches. Storage array 130 may be any type of storage array such as a network-attached storage (NAS) filer or a blocked-based device over a storage area network (SAN). Storage array 130 may include a manager 132 and an array of devices 136 (e.g., disks). Manager 132 is a computer program executing on one or more processors, which may be implemented as an appliance or a plurality of appliances working in tandem. Manager 132, may, for example, comprise a plurality of storage processors, as generally understood in the art of storage arrays. While storage arrays are typically made up of a plurality of disks, it should be recognized that as prices for solid-state non-volatile storage devices fall, they are increasingly taking the place of rotating disk storage media. The use of the term, "disk" herein, should therefore not be construed as limited only to rotating disk storage media, but also what is become known as solid state disks, or "SSDs."

Manager 132 maintains a request queue 134, which is a list of pending IO requests that may be satisfied in any order. Each request comprises a request to read and/or write data to or from storage array 130. Each read request identifies an address, address range or other identifier of the data to be read whereas write requests include data to be written along with an identifier for a location in the array where the data is to be written. Each request that is pending in request queue 134 corresponds to a request from one of hosts 110. QoS policy for hosts 110 governs their accesses to storage array 130 in the manner described in U.S. patent application Ser. No. 12/260,041, filed Oct. 28, 2008, the entire contents of which are incorporated by reference herein.

Figure 1B:
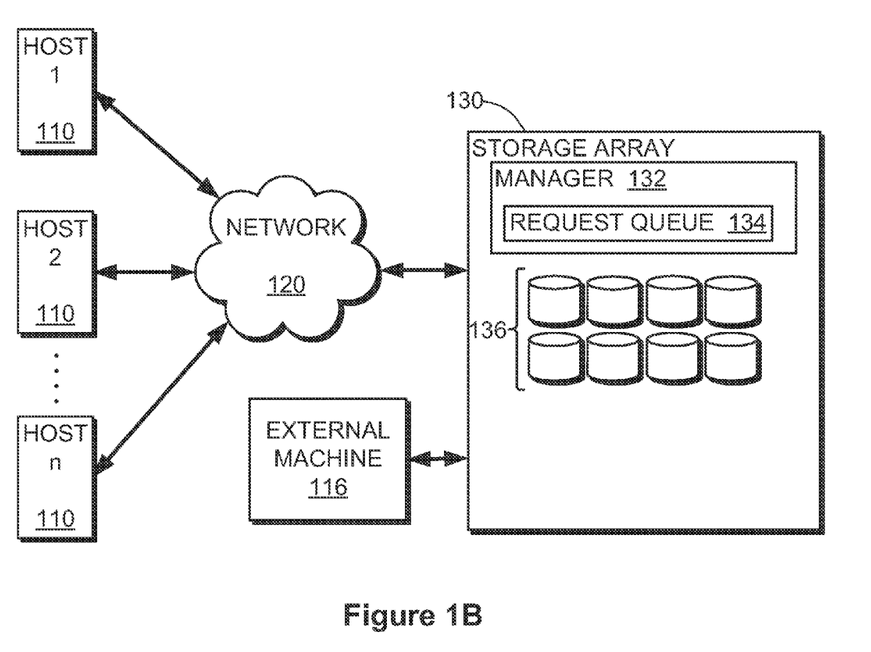
FIG. 1B illustrates a system having a plurality of hosts and an external machine accessing a common storage array, which may benefit from one or more embodiments of the present invention.

In another embodiment, shown in FIG. 1B, an external machine 116 is also connected to the shared resource, storage array 130. External machine 116 may also comprise a general purpose computer system having one or more applications, virtual machines, or other entities. It is referred to herein as "external" is because it is not bound by any QoS policy or management that is applied to hosts 110. External machine 116 may be coupled to storage array 130 through interconnection network 120 or, as illustrated, directly connected. Although QoS policy for hosts 110 governs their accesses to storage array 130, external machine 116 is not bound by any such policy. As a result, large workloads presented by external machine 116 may cause an undesirable reduction in the available IO access bandwidth and interfere with the IO access bandwidth management of hosts 110. Thus, in this embodiment, hosts 110 are configured to detect when the IO access bandwidth between hosts 110 and storage array 130 is reduced. If the reductions are severe enough, they may be identified as an anomaly, and hosts 110 adapt to lessen the effects of the anomaly. The process for detecting an anomaly and responding to it is further described in U.S. patent application Ser. No. 12/834,324, filed Jul. 12, 2010, the entire contents of which are incorporated by reference herein.

Figure 1C:
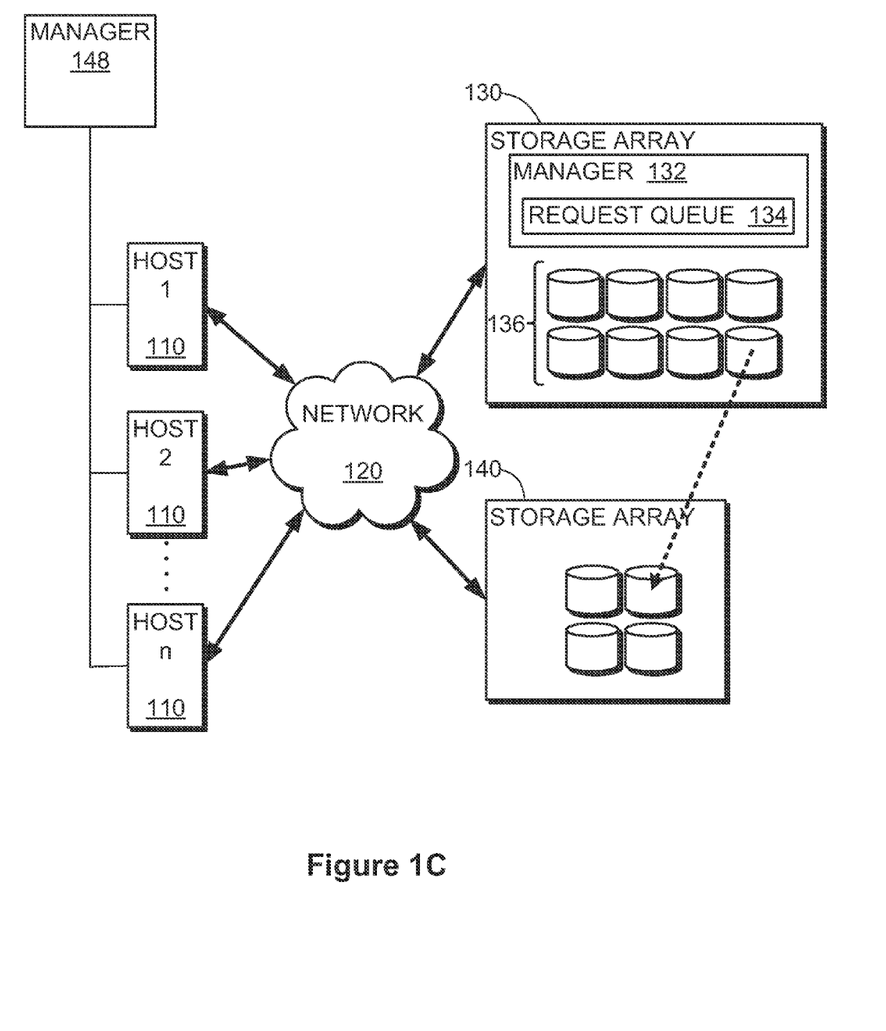
FIG. 1C illustrates a system having a plurality of hosts accessing multiple storage arrays, which may benefit from one or more embodiments of the present invention.

FIG. 1C illustrates a system having a plurality of hosts accessing multiple storage arrays, which may benefit from one or more embodiments of the present invention. In this embodiment, a manager 148, which is a computer program that resides and executes in a central server (not shown) (or alternatively, in one of hosts 110), is in communication with each host 110, and carries out workload migration between storage arrays (e.g., from storage array 130 to storage array 140) in the manner described in U.S. patent application Ser. No. 12/566,435, filed Sep. 24, 2009, the entire contents of which are incorporated by reference herein.

Figure 2:
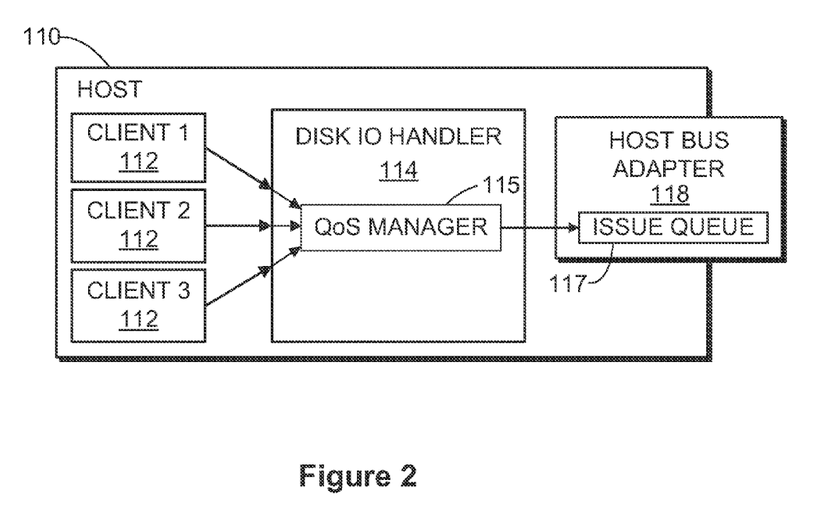
FIG. 2 shows an exemplary host.

FIG. 2 shows an exemplary host 110. Host 110 includes a plurality of clients 112, a disk IO handler 114, and a host bus adapter (HBA) 118. As used herein, the term, "client" is intended to be broadly interpreted as a software entity such as a process, a user login, an application, a virtual machine, a collection of any of the above, etc. In an exemplary non-virtualized system, each client 112 may be an application running on a host operating system (not shown) which includes disk IO handler 114. Disk IO handler 114 may be an integrated component of the host operating system, i.e., the OS kernel, or it may be a driver or other external component. In either case, each client 112 may issue IO requests (read or write) to disk IO handler which implements a quality of service (QoS) manager 115. QoS manager 115 receives each request and, in accordance with a control algorithm such as that described below, immediately or eventually passes the request to issue queue 117 of host bus adapter 118 and to storage array 130. Although generally implemented in hardware as shown in FIG. 2, it is also possible for all or part of issue queue 117 to be implemented in software, e.g., as described in detail below. Issue queue 117 reflects a list of IO requests pending at storage array 130 (FIG. 1). The term "queue" should not be narrowly construed as a first-in, first-out (FIFO) buffer, but simply a list of pending requests that may be satisfied in any order by storage array 130. In one embodiment, issue queue 117 comprises a set of elements that maintain dispatch and completion information about requests from clients 112 outstanding at storage array 130.

When issue queue 117 is implemented in hardware as part of the HBA for each host, issue queue 117 may have a maximum size that can be exceeded by the total number of requests from clients 112. To accommodate these "overflow" IO requests, a buffer (not shown) in the disk IO handler 114 may receive overflow IO requests from all clients when issue queue 117 is full. In one embodiment, the buffer is a first-in, first-out (FIFO) buffer. When an IO request is satisfied, a slot in the issue queue is opened, and the next (longest-residing) IO request in the buffer is sent to the HBA 118. Although in this embodiment the buffer is a FIFO buffer in which the longest-residing IO request is removed, other algorithms may be implemented, such as preferentially selecting IOs in series that are close to one other.

In another embodiment a separate buffer is provided for each client. When an IO request is issued by a host 110, a new IO request from one of the separate buffers takes its place in the issue queue 117. User-set shares (also sometimes referred to as "weights") for each client on the host can be implemented by changing the frequency of IO request draw from the corresponding client. For example, if clients 1, 2, and 3 are given shares of 100, 200, and 300, respectively, then for every one IO request pulled from the buffer associated with client 1, two IO requests are pulled from the buffer associated with client 2 and three IO requests are pulled from the buffer associated with client 3. It should be noted that some HBAs may be configured to directly manage a plurality of issue queues, so that there could be separately managed individual issue queues for each client. Also, scheduling policies other than proportional sharing, such as scheduling algorithms based on priorities, tokens, credits, reservations, or limits associated with each client, may be implemented I this embodiment.

Figure 3:
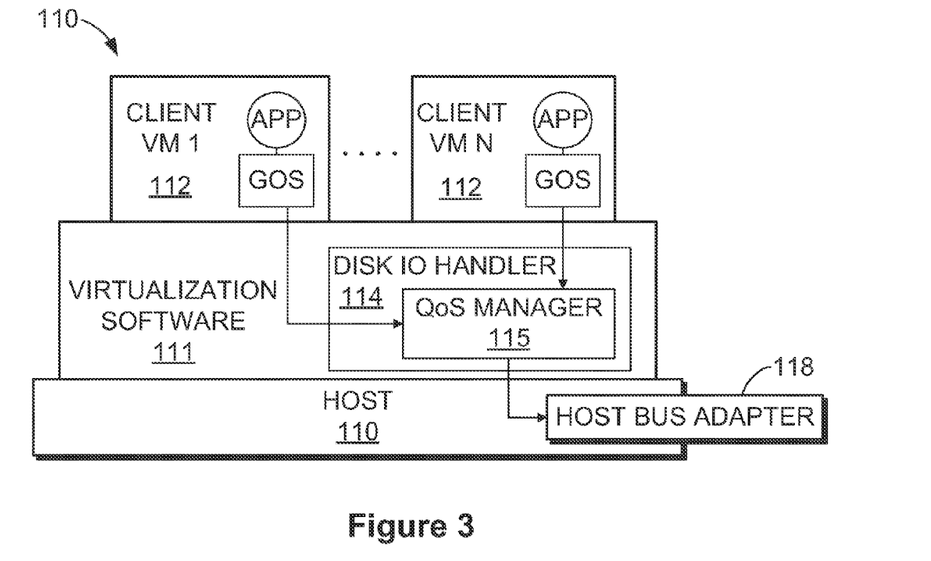
FIG. 3 shows a host comprising a virtualized computer system.

FIG. 3 shows one embodiment of host 110 that comprises a virtualized computer system wherein each client 112 is a virtual machine (VM) and disk IO handler 114 is implemented by virtualization software 111, or a component thereof or attached thereto. Virtualization software 111 may be implemented as one or more layers of software logically interposed between and interfacing with clients 112 as physical hardware of host 110. In one embodiment, virtualization software 111 comprises a virtualization kernel (not shown) for managing physical resources and a virtual machine monitor (VMM) (not shown) for each client 112 for emulating virtual hardware and devices with which software within client 112 interacts. In another embodiment, virtualization software includes a host operating system (not shown) for managing physical resources. These and other virtualization configurations are well known in the field of computer virtualization. Any number N of clients 112 may execute concurrently on host 110 using virtualization software 111, the number N being limited only by physical resources such as memory and processing bandwidth.

Each VM may include a guest operating system (GOS) and one or more applications (APP). The guest operating systems may be a commodity operating system such as Microsoft Windows® or a specialized operating system designed specifically to work with virtualization software 111 (sometimes referred to as a "paravirtualized OS"). In one embodiment, virtualization software 111 resides on a physical data storage medium (not shown) forming part of host 110, whereas virtual disks (not shown) for each client virtual machine are mapped by virtualization software 111 to files that reside remotely or locally. The guest operating system and applications access data at storage array 130 by way of a virtual host bus adapter (not shown) that is mapped by virtualization software 111 to host bus adapter 118. Note that this need not be a one-to-one mapping; e.g., there could be several virtual disk controllers in the guest and multiple physical HBAs on the host. In this case, the virtualization software may choose to send individual requests via different physical HBAs.

If one or more of hosts 110 have one or more VMs running, it may be desirable to assign a QoS share for each VM. For example, one host 110 may have two VMs, wherein one of the VMs requires faster response time. In this case, it would be desirable to provide greater QoS shares to the VM requiring the faster response time. A similar situation can occur for non-VM clients as well, wherein an operating system can give greater shares to one running application in preference to other running applications. Using the QoS policy it is possible, in some embodiments described below, to separately assign shares to individual clients.

In each of the systems illustrated in FIGS. 1A, 1B, and 1C, each host 110 monitors a current latency L, which is the issue queue residency time for the IO request most recently removed from issue queue 117 (FIG. 2). An IO request is added to issue queue 117 when the IO request is issued to storage array 130 and removed from issue queue when an acknowledgement of fulfillment of the request is received by host 110. In an alternate embodiment, the latency is calculated on a fixed IO size basis, to at least partially compensate for varying completion times for requests with very different sizes. For example, a per 4 KB latency may be calculated as Fixed Cost+(L−Fixed Cost)*IO Size/4, where L is the latency as described above and the IO size is in kilobytes.

The current average latency (CAL) is calculated using a well-known Exponentially Weighted Moving Average (EWMA). The degree of weighing past values is determined by a constant smoothing parameter a, which is a number between zero and one. For example if L is the current latency value, then the formula for CAL at time t may be as provided in Equation 1:

$$CAL(t)=(1-\alpha)\times L+\alpha \times CAL(t-1) \quad \text{(Eq. 1)}$$

The value t for "time" may be construed literally such that CAL is periodically calculated in response to a clock signal, but in one embodiment, time t refers to request count, so that CAL is calculated every time, or every X times, a request is satisfied and removed from issue queue 117. As can be seen by Equation 1, α values closer to one will result in less oscillation but slower reaction time. In certain embodiments, for example, α is set very close to one, e.g., 0.99, thereby effectively taking an average over a few hundred IO requests.

The CAL value is then normalized based on an average IO request size. The normalization of CAL based on the average IO request size compensates for the different IO request sizes and results in a more accurate comparison of the latency between entities requesting IOs. Without this normalization, a high latency that is a result of a large IO size might not be distinguished from one that is a result of a small IO size. The normalized latency (NL) is computed using CAL and the average IO request size (avgIOSize), as shown in Equation 2:

$$NL=CAL(t)/(1.0+(avgIOSize/IOSIZE\_ADJUST)) \quad \text{(Eq. 2)}$$

The avgIOSize may be computed by taking the aggregate size of all IO requests over a measurement interval, divided by the number of IO requests during the interval. The value of IOSIZE_ADJUST is a parameter to the algorithm that may be a constant or dynamically determined, and is based on the seek time of the storage array 130 and the peak bandwidth of storage array 130. In one embodiment, the IOSIZE_ADJUST value equals the product of the seek time and the peak bandwidth. For example, when the seek time is 3 ms and the peak bandwidth is 80 MB/sec, the IOSIZE_ADJUST value is computed as 240. In experiments, a constant value of either 256 or 512 has produced good utilization results. An alternative to using Equation 2 would be to normalize the latency for each IO request based on the IO request size and them average the normalized latencies thus computed to provide NL.

In another embodiment, the IOSIZE_ADJUST value may be determined based on the expected seek time and peak bandwidth for a particular system. The IOSIZE_ADJUST value may also be dynamically determined by observing the long-term behavior of the workload. This observation may be performed by a central entity (such as manager 148 shown in FIG. 1C) that can obtain measurements of the seek time and bandwidth. In another embodiment, at system startup or periodically during normal operation, a central entity may run specific diagnostics to measure the seek time and peak bandwidth of storage array 130 and then program or update the IOSIZE_ADJUST value.

Figure 4:
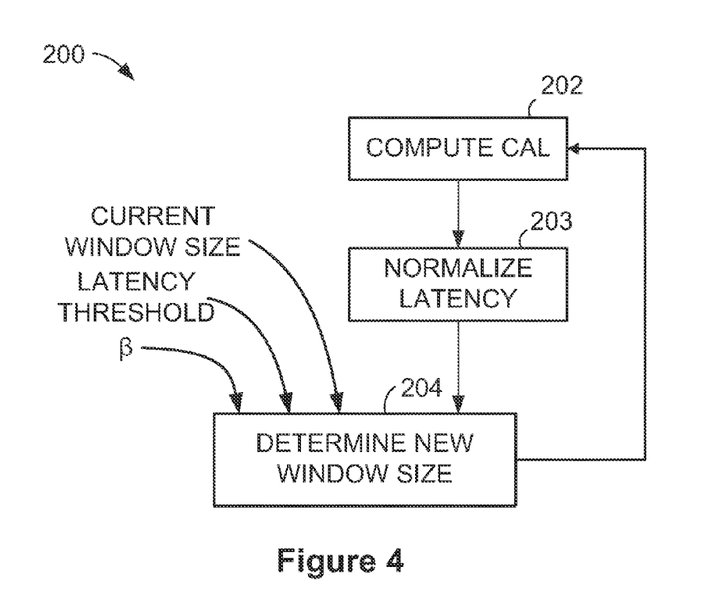
FIG. 4 shows a flow diagram illustrating by way of example a procedure for adjusting window size based on current average latency that is normalized with respect to average IO size.

In one embodiment, the size of the issue queue, also referred to as "window size" or just "window," may be varied according to a control algorithm. The control algorithm may use an additive increase/multiplicative decrease (AIMD) policy or a similar policy. FIG. 4 shows a flow diagram illustrating by way of example a procedure 200 for adjusting window size based on current average latency that is normalized with respect to average IO size. In operation 202, the current average latency (CAL) is computed as described above. The procedure then flows to operation 203, where the normalized latency (NL) is computed as described above and the system-wide latency across all hosts 110 ($L_{SYS}$) is computed as will be described below. Then, in operation 204, a new window size is determined as an adjustment to the current window size according to Equation 3.

$$w(t+1) = (1-\gamma)w(t) + \gamma\left(\frac{LAT_{threshold}}{Lsys(t)}w(t) + \beta\right) \quad \text{(Eq. 3)}$$

Equation 3 solves for a new window size w(t+1), where w(t+1) is the adjusted window size for time t+1; w(t) is the current window size; γ is a constant value; $LAT_{threshold}$ is a system-wide latency threshold selected to balance throughput with latency; $L_{SYS}$ is the system-wide average latency across hosts 110 at time t; and β is a per-host value based on an assigned share representing a relative level of priority of the host relative to other hosts. The constant γ is a value selected between zero and one and defines how much influence the current window size has over the new window size. The lower the value of gamma, the more weight is given to the current window size w(t). In various embodiments, γ is set to be a relatively low value such as 0.2. Because β is used directly in the equation to compute window size, the β value for each host is usually set to a value greater than zero and less than about four such that all β values have a common proportion P to the corresponding assigned share for the corresponding host. Thus, for each host, $\beta_{hostX}$ P*Share$_{hostX}$, wherein P is selected so that all β values are within a particular range, i.e., below a small constant, such as 4, and the assigned share is a value that may be arbitrarily assigned by an administrator to assign proportional access to the storage array. Theoretically, the equilibrium value of window size resulting from Equation 3 for each host will be proportional to the corresponding β value.

For example, referring back to FIGS. 1A-1C, if there are four hosts 110, including three normal hosts that do not require very fast disk access, and one critical host that requires fast disk access, the administrator could assign 1000 proportional shares to each of the normal hosts and 12,000 proportional shares to the critical host, for a total of 15,000 shares. A simple algorithm can be used to reduce these numbers to values between zero and four while maintaining their proportionality. For example, each normal host may be assigned a β value of 0.3 whereas the critical host be assigned a β value of 3.6. For a steady state at or near a selected threshold value of 30 milliseconds, assume the total requests pending at the storage array is 150. In this case, on average, each normal host will have IO requests pending and the critical array will have about 120 requests pending. Thus, storage array 130 can issue about 12 times the number of comparable requests for the critical host in a given amount of time than any of the normal hosts.

In one embodiment, to avoid extreme behavior from the control algorithm, w(t) may be limited by an upper bound $w_{max}$. This avoids very long queues at the array by bounding the latency faced by newly activated hosts. Thus, in this embodiment, the system relies on three main parameters: an upper bound $w_{max}$, the system-wide $LAT_{threshold}$, and the per-host value β. The upper bound can be set independently for each host 110 or can be system wide. In typical configurations, $w_{max}$ may be based on typical values that are used for queue length (32 or 64) and the array configuration such as the number of hosts accessing a volume, number of physical disks in the volume, etc. In addition, a lower bound on the window size may be implemented in order to avoid starvation. In one embodiment for example, a lower bound of four is imposed on the window size.

Latency threshold, $LAT_{threshold}$, may be set empirically based on the relationship between latency and throughput. The algorithm described herein will tend toward a latency close to $LAT_{threshold}$. Furthermore, the overall number of pending IO requests (i.e., the sum of all issue queue depths) will be proportional to the product of $LAT_{threshold} \times$ capacity, wherein the capacity is the number of IO requests that can be processed by storage array 130 in a given amount of time. Therefore, so long as capacity does not reduce too much (e.g., as a result of an increase in the number of reads verses writes, increased amount of data requested to be read or written by each request, or reduced sequentiality of data causing an increase in seek time) there should be sufficient number of pending IO requests at the storage array 130. A typical conservative value for $LAT_{threshold}$ would be between 30 and 50 milliseconds. In one embodiment, $LAT_{threshold}$ is a user-adjustable parameter with a broad range, e.g., 15-200 milliseconds. User input could therefore be used to set the threshold based on application-specific requirements. In addition to QoS fairness, efficient utilization of the storage array and a work-conserving algorithm are important goals. In another embodiment, $LAT_{threshold}$ can also be adjusted by observing the long-term behavior of the workload. This observation may be performed by a central entity that can obtain latency and bandwidth information from all hosts and observe the latency values that correspond to various peaks in the observed bandwidth.

Figure 5:
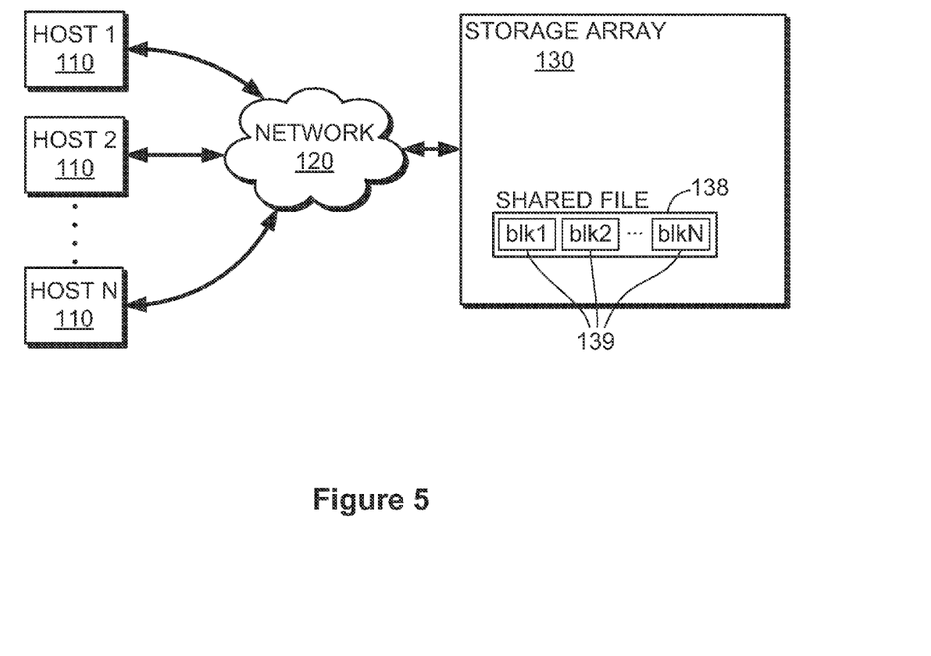
FIG. 5 illustrates a shared file that stores latency values computed by each of multiple hosts in a decentralized manner.

FIG. 5 illustrates a shared file that stores latency values computed by each of multiple hosts in a decentralized manner. In this embodiment, shared file 138 is accessible by multiple hosts simultaneously. Each host 110 owns a single corresponding disk block 139 occupied by shared file 138 and periodically writes its normalized latency value and other IO statistics into its corresponding disk block. TABLE 1 shows an example of shared file 138 and the types of IO statistics maintained in shared file 138.

TABLE 1

| Host/Client | Avg. I/O request size | Normalized Latency | Window Size |
|---|---|---|---|
| Block1 | 100 | 23 | 32 |
| Block 2 | 200 | 15 | 28 |
| Block N | 512 | 40 | 16 |

Each host 110 is able to update its own IO statistics stored in the shared file 138. However, the entries in the shared file 138 may be read by any of hosts 110. As such, each host 110 is able to calculate a system-wide average latency across hosts 110 ($L_{SYS}$), representing the average latency of storage array 130, using the IO count values and the normalized latency values read from shared file 138. $L_{SYS}$ is calculated according to Equation 4:

$$L_{SYS} = \left( \frac{\sum (IOcount \times NL)}{\sum IOcount} \right) \quad \text{(Eq. 4)}$$

Figure 6:
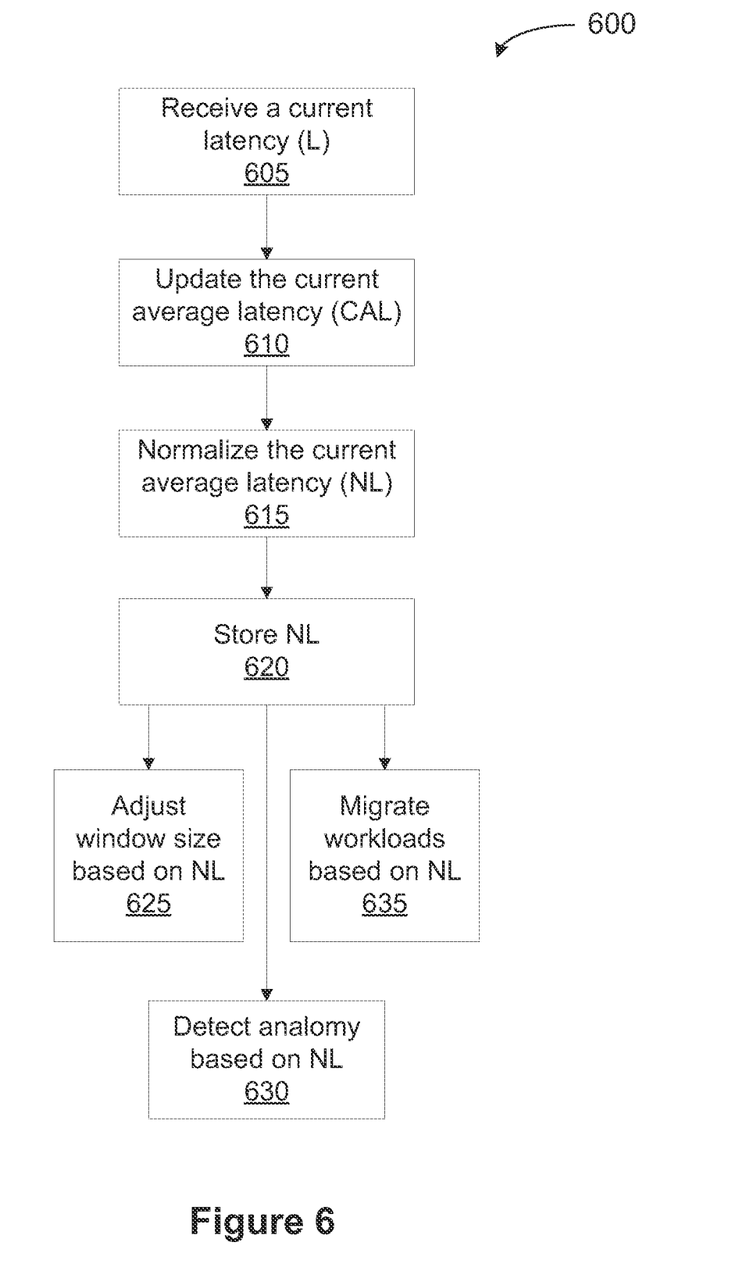
FIG. 6 shows a flow diagram a method for computing a normalized latency and using the normalized latency in a variety of different applications according to one or more embodiments of the present invention.

FIG. 6 shows a flow diagram a method for computing a normalized latency and using the normalized latency in a variety of different applications according to one or more embodiments of the present invention. At step 605 a current latency value (L) is received. At step 610, the current average latency (CAL) is updated based on the current latency in accordance with Equation 1 above. At step 615 the current average latency is normalized to produce NL in accordance with Equation 2 above. At step 620 the NL is stored in shared file 138. Then, the normalized latency, NL, values can then be used in a variety of different applications. Step 625 shows the NL values being used to adjust window size in accordance with Equation 3 above. Step 630 shows the NL values being used to detect an anomaly. The details of this step are described in U.S. patent application Ser. No. 12/834,324. Step 635 shows the NL values being used to migrate workloads between storage arrays. The details of this step are described in U.S. patent application Ser. No. 12/566,435.

In the embodiments of the present invention described above, the normalized latency, NL, was computed per host. In other embodiments of the present invention, where the host has virtual machines (or more generally, clients) running therein, the normalized latency, NL, may be computed on a per client level. In such embodiments, the various applications of the normalized latency values described above can be carried out at the granularity of a client or a VM. For example, QoS policy can be enforced among clients of a host based on normalized latency, and workload migration may be carried out at the client level instead of the host level.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of managing a shared IO resource that is accessed by a plurality of hosts that includes a first host and a second host, comprising:

at the first host, monitoring latencies of IO requests issued by the first host to the shared IO resource, computing a first normalized latency value by dividing an average latency value by an average IO size of the IO requests issued by the first host, and storing the first normalized latency value, wherein the first host is assigned a first number of shares to the shared IO resource in accordance with a quality of service (QoS) policy;

at the second host, monitoring latencies of IO requests issued by the second host to the shared IO resource, and computing a second normalized latency value by dividing an average latency value by an average IO size of the IO requests issued by the second host, and storing the second normalized latency value, wherein the second host is assigned a second number of shares to the shared IO resource in accordance with the QoS policy; and executing a management process for the shared IO resource using the first normalized latency value and the second normalized latency value, including:

adjusting a window size of the first host based on the first normalized latency value and the first number of shares, wherein the window size of the first host relates to the size of the IO request queue for the first host, and adjusting a window size of the second host based on the second normalized latency value and the second number of shares, wherein the window size of the second host relates to the size of the IO request queue for the second host.

2. The method of claim 1, wherein the first normalized latency value and the second normalized latency value are stored in a shared file that is maintained by the shared IO resource and accessible by each of the hosts.

3. The method of claim 1, wherein the management process for the shared IO resource includes enforcing the quality of service (QoS) policy for a group of hosts including the first host and the second host.

4. A tangible non-transitory computer-readable medium embodying program instructions for managing a shared IO resource that is accessed by a plurality of hosts that includes a first host and a second host, the program instructions causing execution of a method, the method comprising:

at the first host, monitoring latencies of IO requests issued by the first host to the shared IO resource, computing a first normalized latency value by dividing an average latency value by an average IO size of the IO requests issued by the first host, and storing the first normalized latency value, wherein the first host is assigned a first number of shares to the shared IO resource in accordance with a quality of service (QoS) policy;

at the second host, monitoring latencies of IO requests issued by the second host to the shared IO resource, and computing a second normalized latency value by dividing an average latency value by an average IO size of the IO requests issued by the second host, and storing the second normalized latency value, wherein the second host is assigned a second number of shares to the shared IO resource in accordance with the QoS policy; and executing a management process for the shared IO resource using the first normalized latency value and the second normalized latency value, including:

adjusting a window size of the first host based on the first normalized latency value and the first number of shares, wherein the window size of the first host relates to the size of the IO request queue for the first host, and adjusting a window size of the second host based on the second normalized latency value and the second number of shares, wherein the window size of the second host relates to the size of the IO request queue for the second host.

5. The tangible non-transitory computer-readable medium of claim 4, wherein the first normalized latency value at time t, NL(t), is calculated from a non-normalized latency value of the first host at time t, CAL(t), as follows:

NL(*t*)=CAL(*t*)/(1.0+(the average IO size+an adjustment factor).

6. The tangible non-transitory computer-readable medium of claim 5, wherein the adjustment factor is dependent on a seek time and a peak bandwidth of the shared IO resource.

7. The tangible non-transitory computer-readable medium of claim 5, wherein the adjustment factor is a product of a seek time and a peak bandwidth of the shared IO resource.

8. The tangible non-transitory computer-readable medium of claim 5, wherein the non-normalized latency value at time t, CAL(t), is calculated as follows:

CAL(*t*)=(1−α)×*L*+α×CAL(*t*−1), where L is a current observed latency, α is a constant smoothing parameter, and CAL(t−1) is a latency value calculated at a previous time.

9. The tangible non-transitory computer-readable medium of claim 8 further embodying program instructions for the adjusting the window sizes in accordance with the calculated first normalized latency value.

10. The tangible non-transitory computer-readable medium of claim 9, wherein the window size is adjusted according to the following formula:

$$w(t+1) = (1-\gamma)w(t) + \gamma\left(\frac{LAT_{threshold}}{NL(t)}w(t) + \beta\right),$$

where w(t+1) is the adjusted window size for time t+1; w(t) is the current window size; γ is a constant value selected between zero and one and determines the influence that the current window size has on the adjusted window size; $LAT_{threshold}$ is a system-wide latency threshold selected to balance throughput with latency; NL(t) is the calculated first normalized latency value at time t; and β is a per-host value based on an assigned share representing a relative level of priority of the host relative to other hosts.

* * * * *